United States Patent
Wang et al.

(10) Patent No.: US 11,999,344 B2
(45) Date of Patent: Jun. 4, 2024

(54) SYSTEM AND METHOD FOR SELECTING AN INTERMEDIATE PARKING GOAL IN AUTONOMOUS DELIVERY

(71) Applicant: Beijing Jingdong Qianshi Technology Co., Ltd., Beijing (CN)

(72) Inventors: Haiming Wang, Mountain View, CA (US); Liangliang Zhang, Mountain View, CA (US); Qi Kong, Mountain View, CA (US)

(73) Assignee: BEIJING JINGDONG QIANSHI TECHNOLOGY CO., LTD., Beijing (CN)

(*) Notice: Subject to any disclaimer, the term of this patent is extended or adjusted under 35 U.S.C. 154(b) by 167 days.

(21) Appl. No.: 17/676,178

(22) Filed: Feb. 20, 2022

(65) Prior Publication Data

US 2023/0264687 A1  Aug. 24, 2023

(51) Int. Cl.
*B60W 30/06* (2006.01)
*B60W 40/105* (2012.01)
*B60W 40/12* (2012.01)
*B60W 60/00* (2020.01)
*G06N 5/01* (2023.01)

(52) U.S. Cl.
CPC .......... *B60W 30/06* (2013.01); *B60W 40/105* (2013.01); *B60W 40/12* (2013.01); *B60W 60/0011* (2020.02); *G06N 5/01* (2023.01)

(58) Field of Classification Search
CPC ............. B60W 30/06; B60W 60/0011; B60W 40/105; B60W 40/12; G05N 5/01
USPC ........................................................ 340/932.2
See application file for complete search history.

(56) References Cited

U.S. PATENT DOCUMENTS

| | | | | |
|---|---|---|---|---|
| 10,156,848 | B1* | 12/2018 | Konrardy | B60R 25/31 |
| 11,377,096 | B2* | 7/2022 | Fan | G08G 1/145 |
| 11,631,327 | B2* | 4/2023 | Higuchi | G06N 5/01 |
| | | | | 340/932.2 |
| 2008/0231469 | A1* | 9/2008 | Knoll | B62D 15/027 |
| | | | | 340/932.2 |
| 2009/0198443 | A1* | 8/2009 | Yamazaki | G01C 21/3605 |
| | | | | 701/414 |
| 2012/0200430 | A1* | 8/2012 | Spahl | G08G 1/143 |
| | | | | 340/932.2 |
| 2014/0156183 | A1* | 6/2014 | Windeler | G08G 1/147 |
| | | | | 340/932.2 |
| 2014/0214319 | A1* | 7/2014 | Vucetic | G01C 21/3407 |
| | | | | 701/540 |

(Continued)

*Primary Examiner* — Zhen Y Wu
(74) *Attorney, Agent, or Firm* — Scully, Scott, Murphy & Presser, P.C.

(57) ABSTRACT

A system and a method for determining an intermediate parking goal of an autonomous vehicle. The autonomous vehicle includes a controller, the controller has a processor and a storage device storing computer executable code. The computer executable code, when executed at the processor, is configured to: prepare a driving plan toward a final parking goal and a parking plan to park at the final parking goal; drive the autonomous vehicle toward the final parking goal according to the driving plan; switch from the driving plan to the parking plan when the autonomous vehicle is within a predetermined distance to the final parking goal; and when the final parking goal is inaccessible: determine the intermediate parking goal, drive and park the autonomous vehicle at the intermediate parking goal.

20 Claims, 6 Drawing Sheets

(56) References Cited

U.S. PATENT DOCUMENTS

| | | | |
|---|---|---|---|
| 2018/0052460 A1* | 2/2018 | Kurt | G01C 21/3685 |
| 2018/0129981 A1* | 5/2018 | Fujimoto | G06V 40/10 |
| 2019/0259277 A1* | 8/2019 | Dudar | G01C 21/3685 |
| 2019/0308616 A1* | 10/2019 | Jie | G08G 1/14 |
| 2020/0001862 A1* | 1/2020 | Luo | B60W 60/001 |
| 2020/0001863 A1* | 1/2020 | Li | B60W 30/06 |
| 2020/0132482 A1* | 4/2020 | Beaurepaire | G08G 1/143 |
| 2020/0207336 A1* | 7/2020 | Oh | G06V 20/52 |
| 2020/0307559 A1* | 10/2020 | Göricke | B60W 10/20 |
| 2020/0339196 A1* | 10/2020 | Jang | B62D 15/0285 |
| 2020/0346637 A1* | 11/2020 | Zhou | B60W 30/06 |
| 2020/0361450 A1* | 11/2020 | Noguchi | B62D 15/027 |
| 2021/0163068 A1* | 6/2021 | Zhu | G05D 1/021 |
| 2021/0300333 A1* | 9/2021 | Xu | B60W 60/0011 |
| 2021/0383699 A1* | 12/2021 | Xiao | B60W 30/06 |
| 2022/0013012 A1* | 1/2022 | Higuchi | G08G 1/143 |
| 2022/0073101 A1* | 3/2022 | Wang | G01C 21/3453 |
| 2022/0170760 A1* | 6/2022 | Bennati | G08G 1/141 |
| 2022/0204259 A1* | 6/2022 | Moore | B65F 5/00 |

* cited by examiner

SYSTEM AND METHOD FOR SELECTING AN INTERMEDIATE PARKING GOAL IN AUTONOMOUS DELIVERY

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to the field of autonomous driving, and more particularly to systems and methods for selecting an intermediate goal in parking scenario for autonomous delivery.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In autonomous driving, an autonomous vehicle is driven from a start location to a goal location, and after arrival, the autonomous vehicle will park at the goal location if it is available. The autonomous vehicle may drive in a complex parking environment containing streets, unstructured regions, and irregular obstacles, and parking at the goal location is challenging. When the goal location in an open space is inaccessible (occupied or not reachable), the autonomous vehicle cannot park at the goal location, and the autonomous vehicle may be stuck on the road.

Therefore, an unaddressed need exists in the art to address the aforementioned deficiencies and inadequacies.

SUMMARY

In certain aspects, for complex unstructured outdoor environments, the present disclosure uses search algorithms, such as A* and Field D*, for path planning in autonomous driving. The search algorithms A* and Field D* yield fast convergence for discrete state spaces. In certain aspects, the present disclosure uses rapidly random trees (RRTs) and Hybrid A* as the search algorithms, which address the non-holonomic requirement by guaranteeing kinematic constraints during forward search in continuous coordinates. The Hybrid A* search algorithm overcomes A* search algorithm's shortcomings by considering the continuous search space, and the Hybrid A* implements the kinematics of the vehicle to expand the next nodes. However, the Hybrid A* algorithm has some problems for realistic applications. For example, for a robust and efficient path planning, the algorithm cannot guarantee to converge to the optimal solution for any arbitrary given goal, needless to say the given goal is not reachable. That means the existing algorithm cannot handle these error recovery issues once the vehicles are stuck at complex parking space.

In certain aspects, the present disclosure provides an improved system for path planning, where an intermediate goal is selected for an autonomous vehicle to park temporarily. In certain embodiments, the autonomous vehicle includes a controller, the controller has a processor and a storage device storing computer executable code. The computer executable code, when executed at the processor, is configured to:

prepare a driving plan toward a final parking goal and a parking plan to park at the final parking goal;

drive the autonomous vehicle toward the final parking goal according to the driving plan;

switch from the driving plan to the parking plan when the autonomous vehicle is within a predetermined distance to the final parking goal; and when the final parking goal is inaccessible: determine the intermediate parking goal, drive the autonomous vehicle toward the intermediate parking goal, and park the autonomous vehicle to the intermediate parking goal.

In certain embodiments, the driving plan is a path planning, and the parking plan is a parking logic.

In certain embodiments, the final parking goal is inaccessible when both the final parking goal and extended parking goals are not reachable, and the extended parking goals at least includes parking spaces neighboring the final parking goal. In other words, the final parking goal and the extended parking goals are occupied by other vehicles or things, or the parking goal and the extended parking goals are blocked from the autonomous vehicle.

In certain embodiments, the predetermined distance is determined based on speed and size of the autonomous vehicle. In certain embodiments, the predetermined distance is in a range of 10-40 meters. In certain embodiments, the predetermined distance is 20 meters. In certain embodiments, the extended parking goals include the parking spaces within a 2-15 meter radius to the final parking goal. In certain embodiments, the extended parking goals include the parking spaces within a 10 meter radius to the final parking goal. In certain embodiments, the extended parking goals include the parking spaces within a 5 meter radius to the final parking goal. In certain embodiments, the radius is determined according to the size of the autonomous vehicle.

In certain embodiments, the computer executable code is configured to determine the intermediate parking goal when the parking plan has been failed for a predetermined number of times. In certain embodiments, the predetermined number of times is five.

In certain embodiments, the intermediate parking goal is determined by:

searching candidate nodes for the intermediate parking goal;

calculating cost for each of the candidate nodes; and selecting one of the candidate nodes that has the lowest cost as the intermediate parking goal.

In certain embodiments, the candidate nodes form a tree data structure, and the intermediate parking goal is determined from the tree data structure using breadth-first-search (BFS). In certain embodiments, the searching of the candidate nodes is performed in an area observable by the autonomous vehicle, such as viewable by cameras installed on the autonomous vehicle.

In certain embodiments, current location of the autonomous vehicle is defined as an initial candidate nodes, and the computer executable code is configured to determine candidate nodes by:

defining a current location of the autonomous vehicle as an initial candidate node;

extending the initial candidate node forward and backward to obtain neighboring candidate nodes from the initial candidate node;

defining each of the neighboring candidate nodes as a current node, and extending the neighboring candidate nodes from the current node to obtain neighboring candidate nodes from the current node; and combining the initial candidate node and the neighboring candidate nodes within a predetermined area around the autonomous vehicle to obtain the candidate nodes.

In certain embodiments, the predetermined area is the area observable by the autonomous vehicle.

In certain embodiments, the cost for each of the candidate nodes is calculated by:

$$\text{node cost} = C_{goal} + C_{vehicle} + C_{boundary} + C_{lane} + C_{obs},$$

where $$C_{goal} = W_{goal} * D_{(node\text{-}parking\_goal)}^2,$$

$$C_{vehicle} = W_{vehicle} * D_{(node\text{-}vehicle\_position)}^2,$$

$$C_{boundary} = W_{boundary} * D_{(node\ project\ to\ boundary)}^2,$$

$$C_{lane} = W_{lane} * (1/D_{(node\ project\ to\ lane\ center)})^2, \text{ and}$$

$$C_{obs} = W_{obs} * (1/D_{(node\ distance\ to\ obs)})^2.$$

$D_{(node\text{-}parking\_goal)}$ is a distance from the candidate node to the final parking goal, $D_{(node\text{-}vehicle\_position)}$ is a distance from the candidate node to the autonomous vehicle, $D_{(node\ project\ to\ boundary)}$ is a distance from the candidate node to a closest boundary of a road, $D_{(node\ project\ to\ lane\ center)}$ is a distance from the candidate node to a center of a lane neighboring the candidate node, $D_{(node\ distance\ to\ obs)}$ is a distance from the candidate node to a closest obstacle, and $W_{goal}$, $W_{vehicle}$, $W_{boundary}$, $W_{lane}$, and $W_{obs}$ are corresponding weights.

In certain embodiments, the weights are learned by a neural network or set manually based on experience and optimization. In certain embodiments, the weights are set as follows: $W_{goal}=5.0$, $W_{vehicle}=0.2$, $W_{boundary}=10.0$, $W_{lane}=5.0$, and $W_{obs}=5.0$.

In certain embodiments, the computer executable code is configured to, when drive the autonomous vehicle to the intermediate parking goal: monitor the final parking goal, and drive the autonomous vehicle to the final parking goal when the final parking goal is accessible (no longer being occupied or blocked). In certain embodiments, the monitoring includes both the final parking goal and the extended parking goals.

In certain embodiments, the vehicle sensor comprises at least one of a camera, a LIDAR device, a global positioning system (GPS), a speedometer, an accelerometer, and an inertial measurement unit (IMU).

In certain embodiments, the controller is an embedded device.

In certain aspects, the present disclosure relates to a method for determining an intermediate parking goal of an autonomous vehicle. In certain embodiments, the method includes:

preparing, by a controller of the autonomous vehicle, a driving plan toward a final parking goal and a parking plan to park at the final parking goal;

driving, by the controller, the autonomous vehicle toward the final parking goal according to the driving plan;

switching, by the controller, the driving plan to the parking plan when the autonomous vehicle is within a predetermined distance to the final parking goal; and determining the intermediate parking goal and driving the autonomous vehicle to the intermediate parking goal when the final parking goal is inaccessible.

In certain embodiments, the intermediate parking goal is determined by:

searching candidate nodes for the intermediate parking goal;

calculating cost for each of the candidate nodes; and selecting one of the candidate nodes that has the lowest cost as the intermediate parking goal.

In certain embodiments, the candidate nodes form a tree data structure, and the intermediate parking goal is determined from the tree data structure using breadth-first-search (BFS).

In certain embodiments, the cost for each of the candidate nodes is calculated by:

$$\text{node cost} = C_{goal} + C_{vehicle} + C_{boundary} + C_{lane} + C_{obs},$$

where $$C_{goal} = W_{goal} * D_{(node\text{-}parking\_goal)}^2,$$

$$C_{vehicle} = W_{vehicle} * D_{(node\text{-}vehicle\_position)}^2,$$

$$C_{boundary} = W_{boundary} * D_{(node\ project\ to\ boundary)}^2,$$

$$C_{lane} = W_{lane} * (1/D_{(node\ project\ to\ lane\ center)})^2, \text{ and}$$

$$C_{obs} = W_{obs} * (1/D_{(node\ distance\ to\ obs)})^2.$$

$D_{(node\text{-}parking\_goal)}$ is a distance from the candidate node to the final parking goal, $D_{(node\text{-}vehicle\_position)}$ is a distance from the candidate node to the autonomous vehicle, $D_{(node\ project\ to\ boundary)}$ is a distance from the candidate node to a closest boundary of a road, $D_{(node\ project\ to\ lane\ center)}$ is a distance from the candidate node to a center of a lane neighboring the candidate node, $D_{(node\ distance\ to\ obs)}$ is a distance from the candidate node to a closest obstacle, and $W_{goal}$, $W_{vehicle}$, $W_{boundary}$, $W_{lane}$, and $W_{obs}$ are corresponding weights.

In certain embodiments, the weights are set as follows: $W_{goal}=5.0$, $W_{vehicle}=0.2$, $W_{boundary}=10.0$, $W_{lane}=5.0$, and $W_{obs}=5.0$.

In certain embodiments, the method further includes:

monitoring the final parking goal when driving the autonomous vehicle to the intermediate parking goal; and driving the autonomous vehicle to the final parking goal when the final parking goal is accessible.

In certain aspects, the present disclosure relates to a non-transitory computer readable medium storing computer executable code. In certain embodiments, the computer executable code, when executed at a processor of a controller in an autonomous vehicle, is configured to perform the method described above.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

Figure 1:
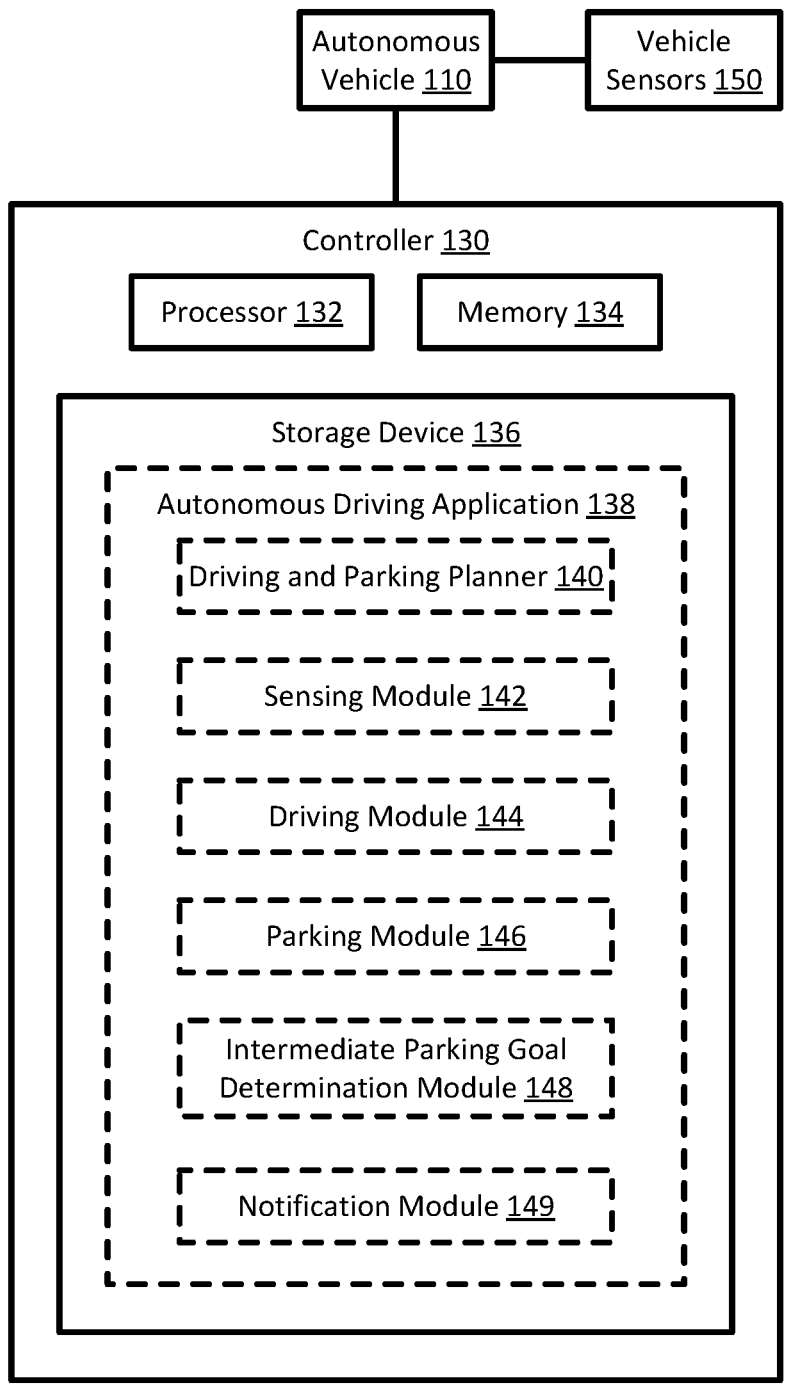
FIG. 1 schematically depicts a system for selecting an intermediate parking goal of an autonomous vehicle according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" or "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module or unit may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

FIG. 1 schematically depicts an autonomous driving system according to certain embodiments of the present disclosure. As shown in FIG. 1, the system 100 includes an autonomous vehicle 110, a controller 130, and vehicle sensors 150. The controller 130 and the vehicle sensors 150 are installed on the autonomous vehicle 110. In certain embodiments, the autonomous vehicle 110 is a delivery vehicle of an ecommerce platform, which delivers products to customers, to delivery stations, or to storage centers. In certain embodiments, the autonomous vehicle 110 could be an electric vehicle, a gasoline vehicle, a diesel vehicle, a hybrid vehicle, or a vehicle using other energy sources. The controller 130 may be a server computer, a cluster, a cloud computer, a general-purpose computer, a headless computer, or a specialized computer, which provides self-driving service for the autonomous vehicle 110. In certain embodiments, the controller 130 is a specialized computer or an embedded system which have limited computing power and resources. The vehicle sensors 150 are configured to collect parameters of the vehicle and the environment. In certain embodiments, the vehicle sensors 150 are configured to collect the parameters according to an instruction from the controller 130 and send the collected parameters to the controller 130. In certain embodiments, the vehicle sensors 150 may not need instruction from the controller 130, and the vehicle sensors 150 are configured to collect the parameters when the autonomous vehicle is 110 running, and send the collected parameters to the controller 130. In certain embodiments, the vehicle sensors 150 are configured to collect the parameters at real time. The vehicle sensors 150 may include, but are not limited to, one or more of an image sensor such as a red-green-blue (RGB) camera, a gray scale camera or an RGB-depth (RGB-D) camera, a light detection and ranging (LIDAR) sensor, a Radar sensor, a global positioning system (GPS), a speedometer, an accelerometer, and an inertial measurement unit (IMU).

The controller 130 may include, without being limited to, a processor 132, a memory 134, and a storage device 136. In certain embodiments, the controller 130 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices. The processor 132 may be a central processing unit (CPU) which is configured to control operation of the controller 130. In certain embodiments, the processor 132 can execute an operating system (OS) or other applications of the controller 130. In certain embodiments, the controller 130 may have more than one CPU as the processor, such as two CPUs, four CPUs, eight CPUs, or any suitable number of CPUs. The memory 134 may be a volatile memory, such as the random-access memory (RAM), for storing the data and information during the operation of the controller 130. In certain embodiments, memory 134 may be a volatile memory array. In certain embodiments, the controller 130 may run on more than one processor 132 and/or more than one memory 134. The storage device 136 is a non-volatile data storage media or device. Examples of the storage device 136 may include flash memory, memory cards, USB drives, solid state drives, or other types of non-volatile storage devices such as hard drives, floppy disks, optical drives, or any other types of data storage devices. In certain embodiments, the controller 130 may have more than one storage device 136. In certain embodiments, the controller 130 may also include a remote storage device 136.

The storage device 136 stores computer executable code. The computer executable code includes an autonomous driving application 138. The autonomous driving application 138 includes the code or instructions which, when executed at the processor 132, may perform autonomous driving following a planned path. In certain embodiments, the autonomous driving application 138 may not be executable code, but in a form of circuit corresponding to the function of the executable code. By providing a circuit instead of executable code, the operation speed of the autonomous driving application 138 is greatly improved. In certain embodiments, as shown in FIG. 1, the autonomous driving application 138 includes, among other things, a path and parking planner 140, a sensing module 142, a driving module 144, a parking module 146, an intermediate parking goal determination module 148, and a notification module 149.

The driving and parking planner 140 is configured to prepare a driving plan and a parking plan, send the driving plan to the driving module 144, and send the parking plan to the parking module 146. The driving plan includes a path from the start point of the autonomous vehicle to the goal point (also named end point or parking goal) of the autonomous vehicle. In certain embodiments, the driving and parking planner 140 is configured to prepare the driving plan by considering the distance of the route from the start point to the goal point, the safety of the route, the convenience of the route, and the efficiency of the route. The consideration may be performed using a 2D or 3D map of an area covering the start point, the goal point and the extended area, such as a city; historical traffic record in the area; predicted traffic on the route at the planned driving time; the number of traffic lights on the route, etc. In certain embodiments, when the autonomous vehicle 110 performs the same type of driving tasks in a regular time interval, such as daily package delivery in a county, the driving and parking planner 140 may record the everyday driving plans, and optimize the driving plans according to data collected during completion of the driving tasks. In certain embodiments, the driving plan is a real-time plan, and the driving and parking planner 140 is configured to continuously update the driving plan.

In certain embodiments, the driving and parking planner 140 is configured to prepare the parking plan by considering the parking area having the parking goal, length and width of a possible parking space, and a distance from a lane in a neighboring street to the parking goal. In certain embodiments, the driving and parking planner 140 is configured to prepare the parking plan in advance using the stored map having the details of the parking area. In certain embodiments, the driving and parking planner 140 may also be configured to prepare the parking plan at real-time. For example, the driving and parking planner 140 may make and operate a parking plan when the vehicle is within a predetermined distance to the goal. In certain embodiments, the predetermined distance is determined according to speed and size of the autonomous vehicle. In certain embodiments, the predetermined distance may be in a range of 5-40 meters, or in a rage of 10-20 meters. In certain embodiments, the predetermined distance is 15 meters. In certain embodiments, the parking plan is part of the driving plan, the driving plan uses a driving logic during most of the driving, but uses a parking logic when the vehicle is close to the parking goal.

The purpose of the driving plan is to have a safe and efficient driving from the start point to the parking goal, and the driving speed is important; the purpose of the parking plan is to make the correct decision to maneuver the vehicle so as to have a safe parking at the parking goal, the parking direction of the vehicle may be important, and a slow parking speed may be preferred. Accordingly, parameters to be considered for the driving plan and the parking plan may differentiate from each other significantly.

The sensing module 142 is configured to, during driving and parking of the autonomous vehicle, receive or collect information sensed by the vehicle sensors 150 and feedback information from the driving module 144 and the parking module 146, process the sensing information and the feedback information to obtain status of the autonomous vehicle 110 and the environment, and provide the vehicle status information and the environment information to the driving module 144 and the parking module 146. The information may include, for example, vehicle status information such as lateral position error, lateral position error rate, yaw angle error, yaw angle error rate, steering angle, control input applied to accelerate or brake wheels, control input applied to change steer angle; and environment information such as other vehicles, pedestrians, traffic lights and other traffic signals, lane indicators, intersections and types of intersections, crosswalks, ground and road edges, and obstacles. In certain embodiments, the vehicle sensors 150 include multiple cameras, and the sensing module 142 is configured to process the images collected by the cameras to determine the real-time position and orientation of the vehicle and the environment, and compare the processed information with the planned path and/or the map. In certain embodiments, the sensing module 142 may include a neural network to process the images. In certain embodiments, the vehicle sensors 150 include a LIDAR, and the sensing module 142 is configured to process scanning images collected by the LIDAR to determine objects around the vehicle. In certain embodiments, the vehicle sensors 150 include a speedometer, and the sensing module 142 is configured to receive the real-time speed of the vehicle. In certain embodiments, the vehicle sensors 150 include an IMU, and the sensing module 142 is configured to receive the real-time force, angular rate, and orientation of the vehicle. In certain embodiments, the sensing module 142 is configured to receive controlling torque and yaw moment from the driving module 144 and/or the parking module 146.

The driving module 144 is configured to, upon receiving the driving plan from the driving and parking planner 140, drive the autonomous vehicle 110 from the start point to the parking goal according to the driving plan, and when the autonomous vehicle 110 is within a predetermined distance to the parking goal, the driving module 144 is further configured to send a notification to the parking module 146, and switch the control from the driving module 144 to the parking module 146. In certain embodiments, the predetermined distance is determined according to speed and size of the autonomous vehicle. In certain embodiments, the predetermined distance is a range of about 10-40 meters. In certain embodiments, the predetermined distance is 20 meters or 25 meters. In certain embodiments, the driving module 144 is configured to correct the driving plan at real time based on the status of the autonomous vehicle 110 and the driving environment. In certain embodiments, the driving module 144 may apply torque to the wheels to accelerate or brake the vehicle, and apply yaw moment to the steering wheel to adjust yaw angle. In certain embodiments, the application of the torque and the moment include the magnitude to be applied and the time needed for the application.

The parking module 146 is configured to, upon receiving the notification from the driving module 144 that the autonomous vehicle 110 is close to the goal point, park the autonomous vehicle 110 at the parking goal. In certain embodiments, the parking operation by the parking module 146 and the driving operation by the driving module 144 are similar with some differences. During parking, the speed of the autonomous vehicle 110 should be slow, parallel parking or reverse parking may be needed, and detection of the objects around the parking space (the goal point) may need to be more accurate. In certain embodiments, the driving is in a cruise on-road mode, and the driving planning is performed under Frenet frame. In certain embodiments, the parking operation is planned under the cartesian frame. After successful parking, the parking module 146 is further configured to send a message to the notification module 149, indicating that the autonomous vehicle has been parked at the parking goal.

Figure 2A:
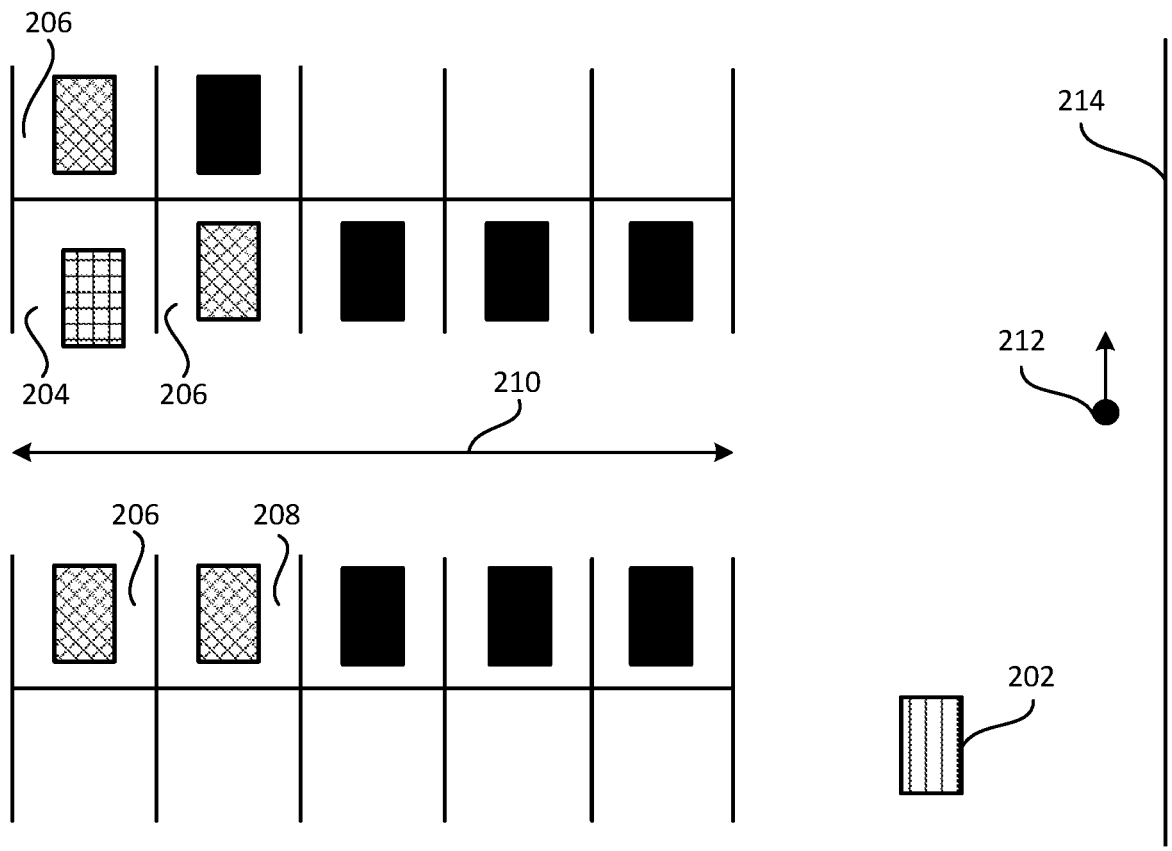
FIG. 2A schematically depicts switching of driving plan of an autonomous vehicle to a parking logic according to certain embodiments of the present disclosure.

The parking module 146 is further configured to, when the parking goal is inaccessible for example occupied by another vehicle, or unreachable for example because the parking goal is surrounded by vehicles or other obstacles, or unreachable for example because roads to the parking goal is blocked, park the autonomous vehicle 110 to an extended parking goal. As shown in FIG. 2A, the autonomous vehicle 110 is driven according to the driving plan, and switches from the driving plan to the parking plan at the position 202. The position 202 is also called the start node, and is about the predetermined distance away from the parking goal 204. The extended parking goal may include parking positions immediately adjacent to the parking goal 204, such as the three parking spaces 206. In certain embodiments, the extended parking goals further include the parking space 208. Although the parking space 208 is at a cross position to the parking goal 204, the parking goal 204 and the parking space 208 are accessible by driving in the same driving lane 210. In certain embodiments, the parking module 146 is configured to search extended parking goals within a predetermined distance around the original parking goal. In certain embodiments, the predetermined distance is in a range of 3-10 meters. In certain embodiments, the predetermined distance is in a range of 4-6 meters. In an example, the predetermined distance is 5 meters. In certain embodiments, the distance between the original parking goal and an extended parking goal is calculated from the center of the original parking goal and the center of the extended parking goal. In certain embodiments, the distance is determined based on the size of the autonomous vehicle. After successful parking, the parking module 146 is further configured to send a message to the notification module 149, indicating that the autonomous vehicle 110 has been parked at the corresponding one of the extended goal points.

In certain embodiments, the parking module 146 is configured to try several times before giving up the parking plan to park at the parking goal or at one of the extended parking goals. In certain embodiments, the several times is in a range of 2-10. In certain embodiments, the several times is in a range of 4-6. In one example, the parking module 146 is configured to try the parking plan 5 times to park at the parking goal or the extended parking goals. In certain embodiments, the parking module 146 is configured to try for a predetermined time period before giving up the parking plan to park at the parking goal or the extended parking goals. In certain embodiments, the predetermined time is in a range of 50 millisecond to 5 second. In certain embodiments, the predetermined time is in a range of 250 millisecond to 1 second. In an example, the predetermined time is 500 millisecond.

The parking module 146 is further configured to, when both the goal point and the extended goal points are inaccessible, instruct the intermediate parking goal determination module 148 to locate an intermediate parking goal, and park the autonomous vehicle 110 at the intermediate parking goal. In certain embodiments, the parking module 146 is configured to instruct the intermediate parking goal determination module 148 after the several times of trying the parking plan to park at the parking goal or one of the extended parking goals. As shown in FIG. 2A, because the parking goal 204 and the extended parking goals 206 and 208 are all inaccessible, the autonomous vehicle 110 needs to look for the intermediate parking goal 212 when the autonomous vehicle 110 arrives at the start node 202. The intermediate goal point 212 is close to a road boundary 214 under the situation, but the location of the intermediate goal point 212 is not limited to the position shown in FIG. 2A. After successful parking, the parking module 146 is further configured to send a message to the notification module 149, indicating the parked status of the autonomous vehicle at the intermediate parking goal 212.

The parking module 146 is further configured to, during the process of parking the autonomous vehicle 110 to the intermediate goal point, monitor the availability of the parking goal and the extended parking goals. When the parking goal or one of the extended parking goals is available, the parking module 146 is configured to stop moving to the intermediate parking goal 212, but move and park the autonomous vehicle 110 at the parking goal or the one of the extended parking goal. In certain embodiments, the monitoring of the availability of the parking goal and the extended parking goal is performed at real time, and the parking plan is updated regularly, for example every 10 millisecond to 1 second. In certain embodiments, the update is performed every 50 millisecond to 200 millisecond. In one example, the update is performed every 100 millisecond.

The intermediate parking goal determination module 148 is configured to, upon receiving the instruction from the parking module 146, determine the intermediate parking goal, and send the intermediate parking goal to the parking module 146, such that the parking module 146 can park the autonomous vehicle 110 to the intermediate parking goal. In certain embodiments, the intermediate parking goal determination module 148 is configured to determine the intermediate goal point by the following procedures:

1. Define a neighborhood queue to store extension nodes and a potential intermediate goal queue to store intermediate goal candidates.

2. Initialize the vehicle position point as start node (such as the position 202 shown in FIG. 2A), set status of the position as the parent node, and place the parent node in the neighborhood queue.

3. When the neighborhood queue is not empty, repeat a while loop:

(a) Record the front node (the first node) from the neighborhood queue, consider it as the current node, and delete it from the neighborhood queue.

Figure 2B:
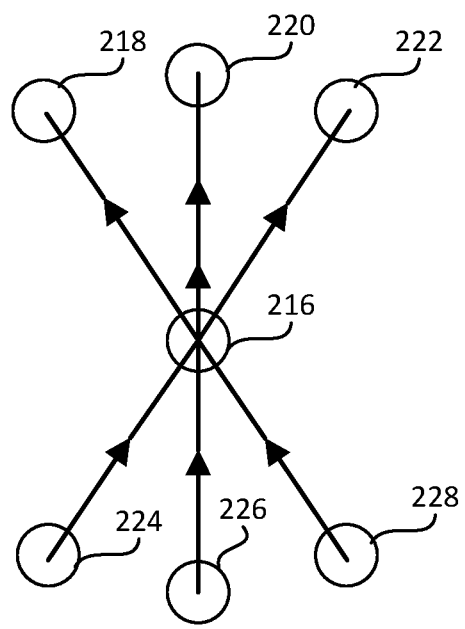
FIG. 2B schematically depicts extending candidate intermediate parking goals from a current node according to certain embodiments of the present disclosure.

(b) Based on this current node, search other nodes in its neighborhood. In certain embodiments, the search is performed using breadth-first-search (BFS). In certain embodiments, the scope of the search is based on the area observable by the vehicle sensors 150. The search is performed as described above in relation to the description of FIG. 2B. FIG. 2B shows node extension plot from a current node 216, where the current node 216 can be extended in the front left direction with a 30 degree deviation to obtain a neighborhood node 218, extended in the front direction to obtain a neighborhood node 220, extended in the front right direction with a 30 degree deviation to obtain a neighborhood node 222. Similar to the above three extensions forward, the current node can also be extended backward to obtain three extensions 224, 226 and 228. After extending from the current node 216, as the second layer of the extension, the disclosure extends from the nodes 218-228, where each of the nodes 218-228 can be regarded as a current node. The extension is performed layer by layer outwards. In certain embodiments, the extension stops when it exhausts the area observable by the autonomous vehicle 110. In certain embodiments, the numbers and locations of the extended nodes from each current node can vary from the above embodiments. In certain embodiments, the extended nodes are obtained by extending forward, backward, leftward, and rightward from a current node. In certain embodiments, the extension is performed by extending about 0.1-2 meters from the current node to its extended nodes. In certain embodiments, the extension is performed by extending 0.5 meter or 1 meter from the current node to its extended nodes. All the extended nodes can be placed in the neighborhood queue.

(c) According to these nodes' status (such as, whether they are overlap with road boundary or obstacles, whether they are located at invalid region, whether they have already been searched), obtain the intermediate goal node candidates, and place the intermediate goal node candidates to the intermediate goal queue.

4. Compute the total cost for all intermediate node candidates in the intermediate goal queue.

5. Find the minimum cost in the intermediate node candidates, and define the intermediate node candidate having the minimum cost as the optimal intermediate parking goal.

In certain embodiments, the intermediate parking goal determination module 148 is configured to calculate the cost for each of the intermediate node candidates by:

$$\text{node cost} = C_{goal} + C_{vehicle} + C_{boundary} + C_{lane} + C_{obs} \quad (1),$$

where:

$$C_{goal} = W_{goal} * D_{(node\text{-}parking\_goal)}^2 \quad (2),$$

$$C_{vehicle} = W_{vehicle} * D_{(node\text{-}vehicle\_position)}^2 \quad (3),$$

$$C_{boundary} = W_{boundary} * D_{(node\ project\ to\ boundary)}^2 \quad (4),$$

$$C_{lane} = W_{lane} * (1/D_{(node\ project\ to\ lane\ center)})^2 \quad (5), \text{ and}$$

$$C_{obs} = W_{obs} * (1/D_{(node\ distance\ to\ obs)})^2 \quad (6).$$

Figure 2C:
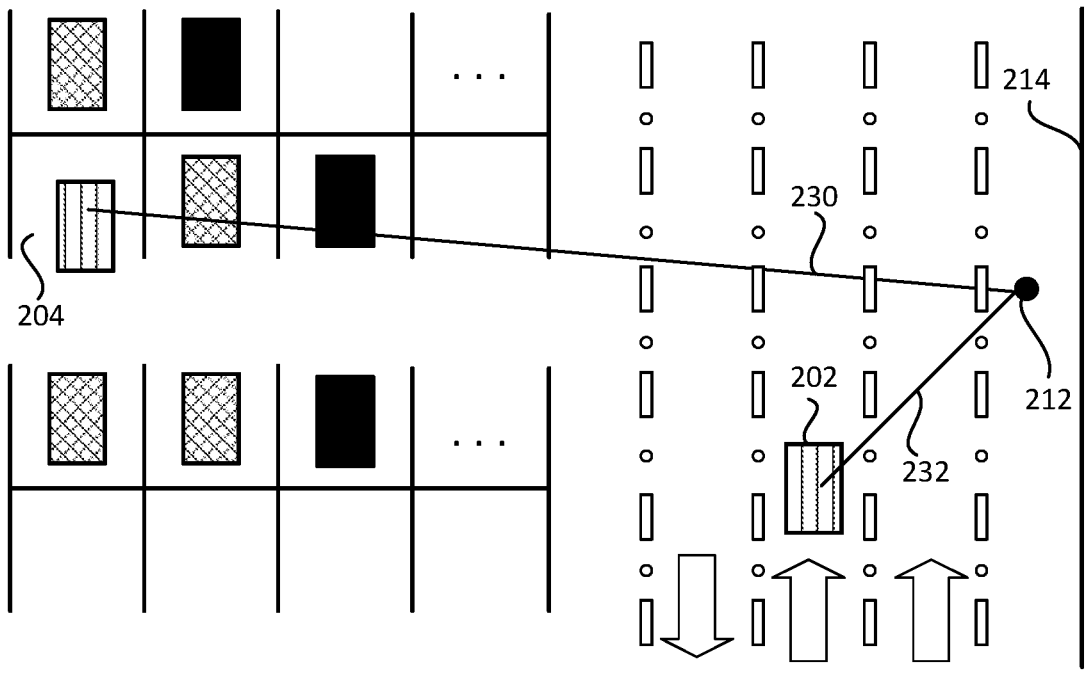
FIG. 2C and FIG. 2D schematically depict distances from a candidate intermediate parking goal according to certain embodiments of the present disclosure.
Figure 2D:
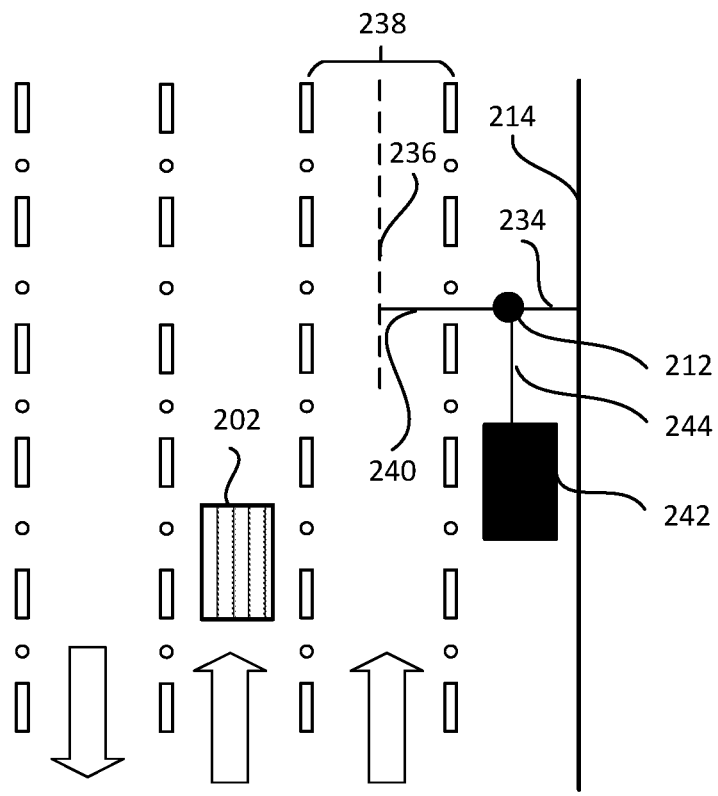

In certain embodiments, the distances are Euclidean distances between two points, or Euclidean distances between one point and its projection on a line. As shown in FIG. 2C and FIG. 2D, $D_{(node\text{-}parking\_goal)}$ is a distance from the candidate node 212 to the final parking goal 204, and is exemplified as the distance 230; $D_{(node\text{-}vehicle\_position)}$ is a distance from 20 the candidate node 212 to the autonomous vehicle 202, and is exemplified as the distance 232;

$D_{(node\ project\ to\ boundary)}$ is a distance from the candidate node 212 to a closest boundary 214 of a road, and is exemplified as the distance 234; $D_{(node\ project\ to\ lane\ center)}$ is a distance from the candidate node 212 to a central line 236 of a lane 238 neighboring the candidate node 212, and is exemplified as the distance 240; $D_{(node\ distance\ to\ obs)}$ is a distance from the candidate node 212 to a closest obstacle 242, and is exemplified as the distance 244; and $W_{goal}$, $W_{vehicle}$, $W_{boundary}$, $W_{lane}$, and $W_{obs}$ are corresponding weights. In certain embodiments, the weights are set as follows: $W_{goal}$=5.0, $W_{vehicle}$=0.2, $W_{boundary}$=10.0, $W_{lane}$=5.0, and $W_{obs}$=5.0. In certain embodiments, the values of the weights may vary.

After determining the intermediate parking goal, the intermediate parking goal determination module 148 is further configured to send the intermediate parking goal to the parking module 146.

Referring back to FIG. 1, the notification module 149 is configured to, after receiving the notice from the parking module 146 that the autonomous vehicle 110 has parked at the parking goal, at one of the extended parking goal, or at the intermediate parking goal, prepare a notification, and send the notification to a customer, an operator, or other staff to pick up the product to be delivered to the parking goal. In certain embodiments, the notification includes information of the product to be delivered and the parking location of the autonomous vehicle 110. The information of the product may include the identification of the product, the dimensions of the product, and the weight of the product.

In certain embodiments, the driving module 144 and the parking module 146 may be combined as one module, and the one module switches from a driving mode to a parking mode when the autonomous vehicle 110 is close to the parking goal. The driving mode corresponds to the function of the driving module 144, and the parking mode corresponds to the function of the parking module 146.

Figure 3:
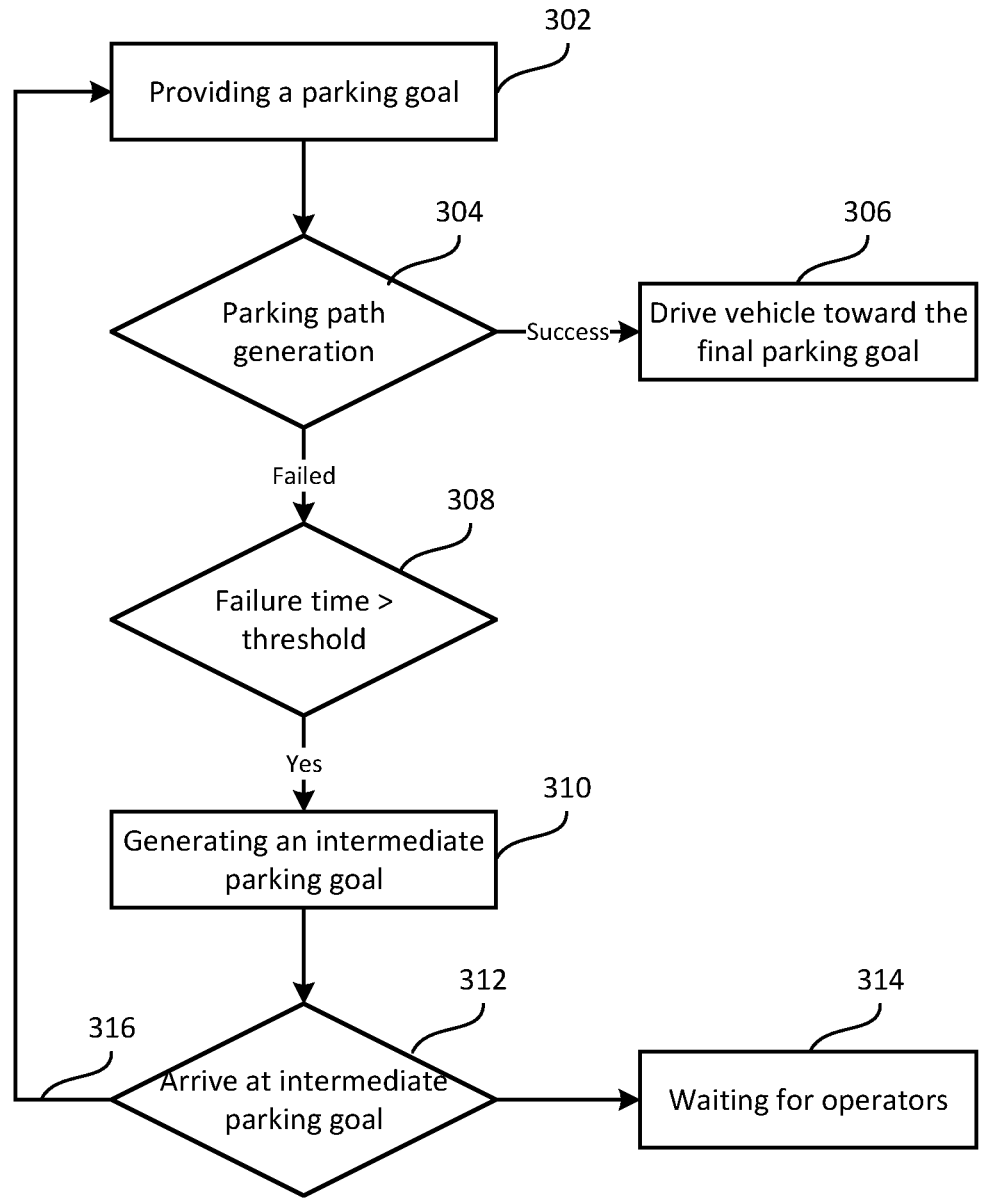
FIG. 3 schematically depicts a flow chart for autonomous driving according to certain embodiments of the present disclosure, where determination of an intermediate parking goal is provided.

FIG. 3 schematically depicts a flow chart for autonomous driving according to certain embodiments of the present disclosure, where an intermediate parking goal is used when the parking goal/extended parking goals are inaccessible (occupied or unreachable). As shown in FIG. 3, for the driving of an autonomous vehicle, such as a delivery truck from a storage warehouse of an ecommerce platform, at step 302, a parking goal is provided. With the parking goal available, the autonomous vehicle generates a parking path at step 304, which is actively used by the autonomous vehicle when it is close to the parking goal, for example when the autonomous vehicle is within 15 meters to the parking goal. If the parking goal is available, the autonomous vehicle drives to the final parking goal using the parking path at step 306. If the autonomous vehicle cannot generate the parking path to the parking goal, for example because the parking goal is inaccessible, the autonomous vehicle will try for a threshold number of times or a threshold length of time. In certain embodiments, the threshold is 2-10 times. In certain embodiments, the threshold is 4-6 times. In an example, the threshold is five times. If the trial is successful after the threshold number of trying, at step 306, the autonomous vehicle drives toward the parking goal and parks there. If the trial is unsuccessful after the threshold number of trying (or after a predetermined time period of trying) as shown in step 308, then the procedure continues to step 310, where the autonomous vehicle will generate an intermediate parking goal, drive and arrive the intermediate parking goal at step 312, send a notice to operators, and wait for the operators at step 314. In certain embodiments, during the drive to the intermediate parking goal, if the autonomous vehicle finds that the final parking goal becomes available, the autonomous vehicle will be driven to the final parking goal at step 316.

Figure 4:
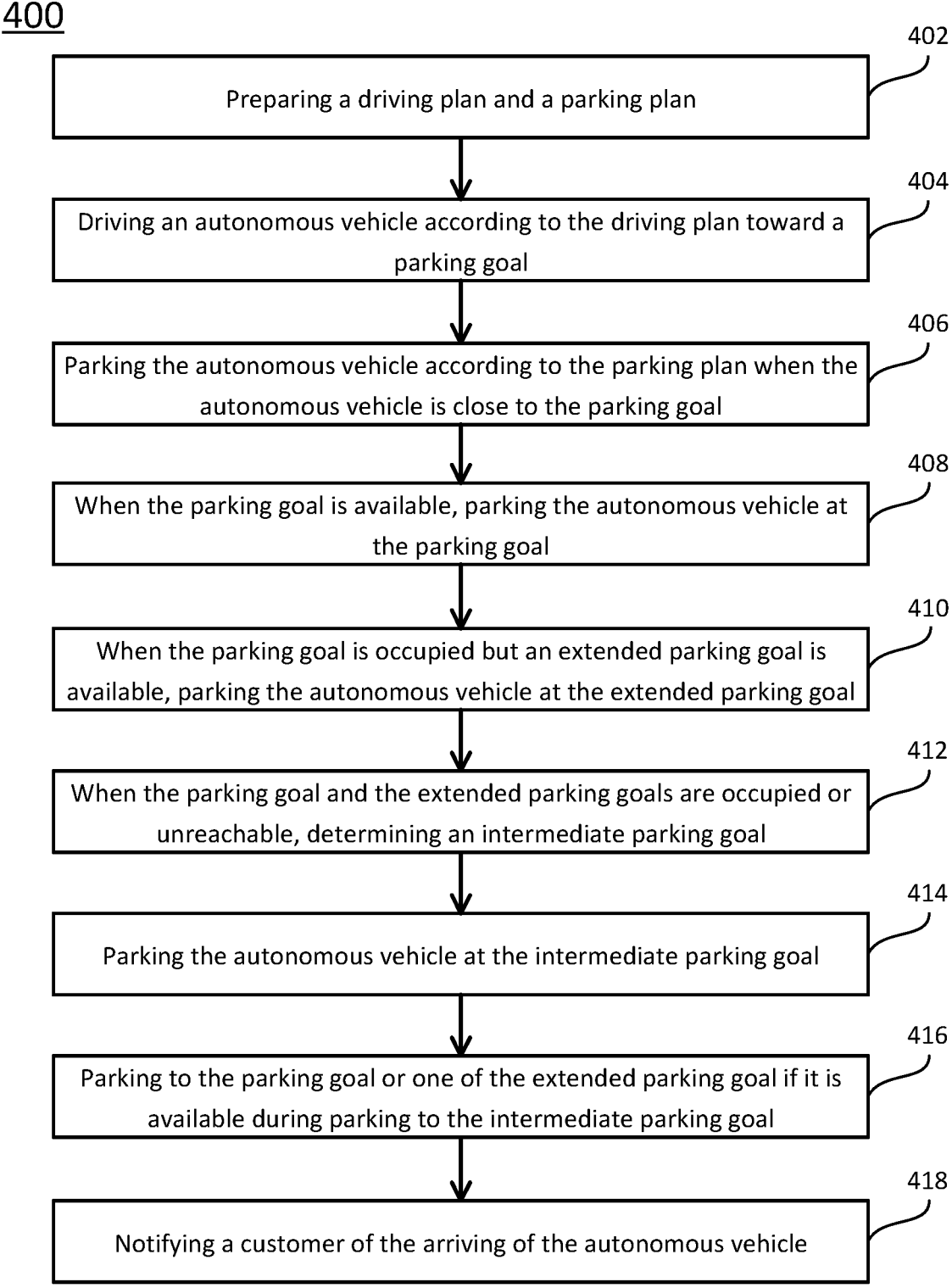
FIG. 4 schematically depicts a method for autonomous driving according to certain embodiments of the present disclosure, where determination of an intermediate parking goal is provided.

FIG. 4 schematically depicts a method for autonomous driving according to certain embodiments of the present disclosure, where an intermediate parking goal may be used when the parking goal and/or extended parking goals are inaccessible. In certain embodiments, the method 400 as shown in FIG. 4 may be implemented on a controller 130 as shown in FIG. 1. It should be particularly noted that, unless otherwise stated in the present disclosure, the steps of the method may be arranged in a different sequential order, and are thus not limited to the sequential order as shown in FIG. 4.

At procedure 402, the driving and parking planner 140 prepares a driving plan and sends the driving plan to the driving module 144, and prepares a parking plan and sends the parking plan to the parking module 146. The driving plan and the parking plan include a parking goal that the autonomous vehicle 110 needs to park the autonomous vehicle 110 at.

At procedure 404, upon receiving the driving plan, the driving module 144 drives the autonomous vehicle 110 from its start point to the parking goal according to the driving plan. At procedure 406, when the autonomous vehicle 110 is within a predetermined distance to the parking goal, the driving module 144 sends a notification to the parking module 146, and the parking module 146 parks the autonomous vehicle 110 according to the parking plan received from the driving and parking planner 140. In certain embodiments, the predetermined distance is about 10-40 meters. In an example, the predetermined distance is 20 meters. In certain embodiments, the predetermined distance is determined based on speed and size of the autonomous vehicle.

At procedure 408, when the parking goal is available and reachable, the parking module 146 parks the autonomous vehicle 110 at the parking goal, and sends a message to the notification module 149.

At procedure 410, when the parking goal is inaccessible, the parking module 146 looks for extended parking goals around the parking goal, and if one of the extended parking goals is available and reachable, the parking module 146 revises the parking plan, parks the autonomous vehicle 110 at the one of the extended parking goals, and sends a message to the notification module 149.

At procedure 412, when all the parking goal and the extended parking goals are inaccessible, the parking module 146 determines an intermediate parking goal.

At procedure 414, after determines the intermediate parking goal, the parking module 146 revises the parking plan, drives the autonomous vehicle 110 toward the intermediate parking goal, parks the autonomous vehicle 110 at the intermediate parking goal, and sends a message to the notification module 149.

At procedure 416, during the parking process to the intermediate parking goal, the parking module 146 monitors the availability of the parking goal and/or the extended parking goals, and if at least one of them is available, revises the parking plan again, drives toward and parks the autonomous vehicle 110 at the parking goal or the one of the extended parking goal that is available and accessible to the autonomous vehicle 110.

At procedure 418, upon receiving the message from the parking module 146 that the autonomous vehicle 110 has been parked at the parking goal, one of the extended parking goals, or the intermediate goal, the notification module 149 prepares a notification and sends the notification to the customer or the staff or the operator, so that the person can come to the location of the autonomous vehicle 110 and picks up the product to be delivered. The notification may include that the autonomous vehicle 110 has arrived, the location the autonomous vehicle 110 parks at, and the product to be delivered.

In certain embodiments, the system and method described above is suitable for implementing last mile autonomous delivery vehicle, but are not limited to the last mile autonomous delivery vehicle. For example, the system and method may also be used on autonomous robots, autonomous passenger cars, and autonomous buses.

Figure 5:
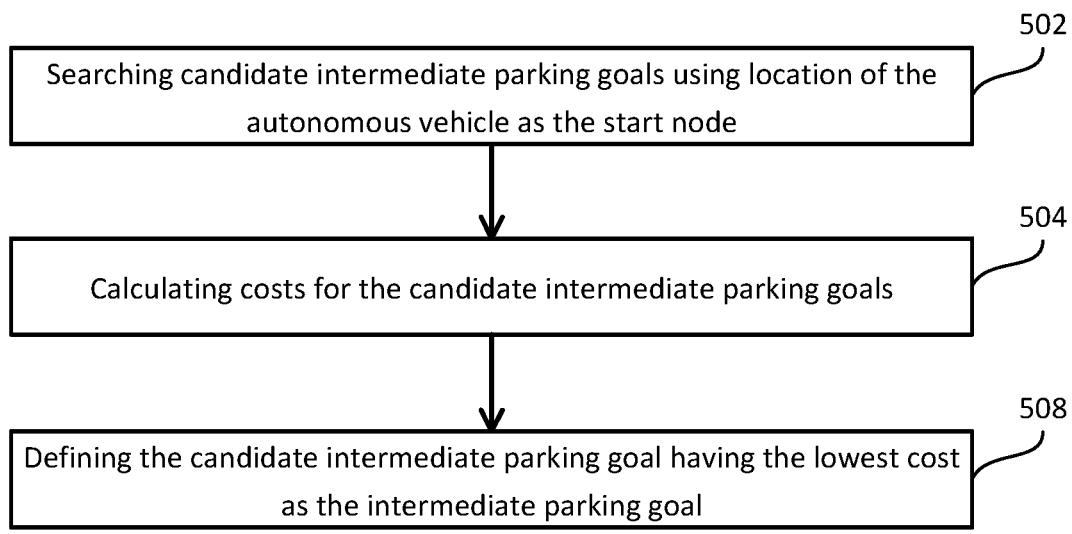
FIG. 5 schematically depicts a method for determining an intermediate parking goal according to certain embodiments of the present disclosure.

FIG. 5 schematically depicts a method for determining an intermediate parking goal according to certain embodiments of the present disclosure. In certain embodiments, the method corresponds to the procedure 412 shown in FIG. 4. In certain embodiments, the method 500 as shown in FIG. 5 may be implemented by the intermediate parking goal determination module 148 as shown in FIG. 1. It should be particularly noted that, unless otherwise stated in the present disclosure, the steps of the method may be arranged in a different sequential order, and are thus not limited to the sequential order as shown in FIG. 5.

At procedure 502, when both the parking goal and the extended parking goals are inaccessible, the intermediate parking goal determination module 148 searches the area around the autonomous vehicle 110, for example based on images taken by the vehicle sensors 150 at the real time. In certain embodiments, the search is performed using breadth-first-search. In certain embodiments, the search can also be performed using Dijkstra's algorithm, which may cost more time than the breadth-first-search. In certain embodiments, the search is performed using the current location of the autonomous vehicle 110 as the start node. After the search, the intermediate parking goal determination module 148 determines a number of candidate intermediate parking goals.

At procedure 504, the intermediate parking goal determination module 148 calculates costs for the candidate intermediate parking goals. In certain embodiments, the costs are calculated based on the equations (1)-(6) as described above.

At procedure 506, the intermediate parking goal determination module 148 ranks the candidate intermediate parking goals according to the costs, and defines the candidate intermediate parking goal having the lowest cost as the intermediate parking goal.

In a further aspect, the present disclosure is related to a non-transitory computer readable medium storing computer executable code. The code, when executed at a processor 132 of the controller 130, may perform the methods as described above. In certain embodiments, the non-transitory computer readable medium may include, but not limited to, any physical or virtual storage media. In certain embodiments, the non-transitory computer readable medium may be implemented as the storage device 136 of the controller 130 as shown in FIG. 1.

In summary, certain embodiments of the present disclosure provide a new method to park a vehicle at a temporary parking spot. During autonomous delivery, when the parking goals is not reachable or feasible path cannot ne generated by the given parking goal, the disclosure considers the current vehicle position as the start node to search an intermediate goal, so that a feasible path can be generated successfully based on the intermediate goal. Further, the disclosure keeps computing the optimal path toward the original parking goal. Once a feasible path can be searched for the original goal, the vehicle can switch to the previous path as the optimal path, which from the current position, parks the vehicle at the original parking goal. By parking at the intermediate goal, the disclosure avoids stuck of the vehicle at the parking goal and block of the traffic, guarantees continued move of the vehicle toward the intermediate goal, and human interference during autonomous delivery process is largely reduced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system for determining an intermediate parking goal of an autonomous vehicle, wherein the autonomous vehicle comprises a controller, the controller comprises a processor and a storage device storing computer executable code, and the computer executable code, when executed at the processor, is configured to:
   prepare a driving plan toward a final parking goal and a parking plan to park at the final parking goal;
   drive the autonomous vehicle toward the final parking goal according to the driving plan;
   switch from the driving plan to the parking plan when the autonomous vehicle is within a predetermined distance to the final parking goal; and
   when the final parking goal is inaccessible: determine the intermediate parking goal, and park the autonomous vehicle to the intermediate parking goal;
   wherein the computer executable code is configured to, when driving the autonomous vehicle to the intermediate parking goal: monitor the final parking goal, and drive the autonomous vehicle to the final parking goal when the final parking goal is accessible.

2. The system of claim 1, wherein the final parking goal is inaccessible when both the final parking goal and extended parking goals are inaccessible, and the extended parking goals at least comprise parking spaces neighboring the final parking goal.

3. The system of claim 2, wherein the predetermined distance is determined based on speed and size of the autonomous vehicle, and the extended parking goals comprise the parking spaces within a predetermined radius to the final parking goal.

4. The system of claim 1, wherein the computer executable code is configured to determine the intermediate parking goal when the parking plan has been failed for a predetermined number of times.

5. The system of claim 1, wherein the intermediate parking goal is determined by:
   searching candidate nodes for the intermediate parking goal;
   calculating cost for each of the candidate nodes; and
   selecting one of the candidate nodes that has the lowest cost as the intermediate parking goal.

6. The system of claim 5, wherein the candidate nodes form a tree data structure, and the intermediate parking goal is determined from the tree data structure using breadth-first-search (BFS).

7. The system of claim 1, wherein current location of the autonomous vehicle is defined as an initial candidate nodes, and the computer executable code is configured to determine candidate nodes by:
 defining a current location of the autonomous vehicle as an initial candidate node;
 extending the initial candidate node forward and backward to obtain neighboring candidate nodes from the initial candidate node;
 defining each of the neighboring candidate nodes as a current node, and extending the neighboring candidate nodes from the current node to obtain neighboring candidate nodes from the current node; and
 combining the initial candidate node and the neighboring candidate nodes within a predetermined area around the autonomous vehicle to obtain the candidate nodes.

8. The system of claim 5, wherein the cost for each of the candidate nodes is calculated by: node cost=$C_{goal}+C_{vehicle}+C_{boundary}+C_{lane}+C_{obs}$, $$C_{goal}=W_{goal}*D_{(node\text{-}parking\_goal)}^2,$$

$$C_{vehicle}=W_{vehicle}*D_{(node\text{-}vehicle\_position)}^2,$$

$$C_{boundary}=W_{boundary}*D_{(node\ project\ to\ boundary)}^2,$$

$$C_{lane}=W_{lane}*(1/D_{(node\ project\ to\ lane\ center)})^2,$$

$$C_{obs}=W_{obs}*(1/D_{(node\ distance\ to\ obs)})^2,$$

$D_{(node\text{-}parking\_goal)}$ is a distance from the candidate node to the final parking goal, $D_{(node\text{-}vehicle,\ position)}$ is a distance from the candidate node to the autonomous vehicle, $D_{(node\ project\ to\ boundary)}$ is a distance from the candidate node to a closest boundary of a road, $D_{(node\ project\ to\ lane\ center)}$ is a distance from the candidate node to a center of a lane neighboring the candidate node, $D_{(node\ distance\ to\ obs)}$ is a distance from the candidate node to a closest obstacle, and $W_{goal}$, $W_{vehicle}$, $W_{boundary}$, $W_{lane}$, and $W_{obs}$ are corresponding weights.

9. The system of claim 8, wherein the weights are set as follows: $W_{goal}$=5.0, $W_{vehicle}$=0.2, $W_{boundary}$=10.0, $W_{lane}$=5.0, and $W_{obs}$=5.0.

10. The system of claim 1, wherein the controller is an embedded device.

11. A method for determining an intermediate parking goal of an autonomous vehicle, comprising:
 preparing, by a controller of the autonomous vehicle, a driving plan toward a final parking goal and a parking plan to park at the final parking goal;
 driving, by the controller, the autonomous vehicle toward the final parking goal according to the driving plan;
 switching, by the controller, the driving plan to the parking plan when the autonomous vehicle is within a predetermined distance to the final parking goal; and
 determining the intermediate parking goal and driving the autonomous vehicle to the intermediate parking goal when the final parking goal is inaccessible;
 wherein the method further comprises:
 monitoring the final parking goal when driving the autonomous vehicle to the intermediate parking goal; and
 driving the autonomous vehicle to the final parking goal when the final parking goal is accessible.

12. The method of claim 11, wherein the intermediate parking goal is determined by:
 searching candidate nodes for the intermediate parking goal;
 calculating cost for each of the candidate nodes; and
 selecting one of the candidate nodes that has the lowest cost as the intermediate parking goal.

13. The method of claim 12, wherein the candidate nodes form a tree data structure, and the intermediate parking goal is determined from the tree data structure using breadth-first-search (BFS).

14. The method of claim 12, wherein the cost for each of the candidate nodes is calculated by: node cost=$C_{goal} C_{vehicle} C_{boundary} C_{lane}+C_{obs}$, $$C_{goal}=W_{goal}*D_{(node\text{-}parking\_goal)}^2,$$

$$C_{vehicle}=W_{vehicle}*D_{(node\text{-}vehicle\_position)}^2,$$

$$C_{boundary}=W_{boundary}*D_{(node\ project\ to\ boundary)}^2,$$

$$C_{lane}=W_{lane}*(1/D_{(node\ project\ to\ lane\ center)})^2,$$

$$C_{obs}=W_{obs}*(1/D_{(node\ distance\ to\ obs)})^2,$$

$D_{(node\text{-}parking\_goal)}$ is a distance from the candidate node to the final parking goal, $D_{(node\text{-}vehicle\_poistion)}$ is a distance from the candidate node to the autonomous vehicle, $D_{(node\ project\ to\ boundary)}$ is a distance from the candidate node to a closest boundary of a road, $D_{(node\ project\ to\ lane\ center)}$ is a distance from the candidate node to a center of a lane neighboring the candidate node, $D_{(node\ distance\ to\ obs)}$ is a distance from the candidate node to a closest obstacle, and $W_{goal}$, $W_{vehicle}$, $W_{boundary}$, $W_{lane}$, and $W_{obs}$ are corresponding weights.

15. A non-transitory computer readable medium storing computer executable code, wherein the computer executable code, when executed at a processor of a controller in an autonomous vehicle, is configured to perform the method of claim 11.

16. The non-transitory computer readable medium of claim 15, wherein the intermediate parking goal is determined by:
 searching candidate nodes for the intermediate parking goal;
 calculating cost for each of the candidate nodes; and
 selecting one of the candidate nodes that has the lowest cost as the intermediate parking goal.

17. The non-transitory computer readable medium of claim 16, wherein the cost for each of the candidate nodes is calculated by: node cost=$C_{goal} C_{vehicle} C_{boundary} C_{lane}+C_{obs}$, $$C_{goal}=W_{goal}*D_{(node\text{-}parking\_goal)}^2,$$

$$C_{vehicle}=W_{vehicle}*D_{(node\text{-}vehicle\_position)}^2,$$

$$C_{boundary}=W_{boundary}*D_{(node\ project\ to\ boundary)}^2,$$

$$C_{lane}W_{lane}*(1/D_{(node\ project\ to\ lane\ center)})^2,$$

$$C_{obs}=W_{obs}(1/D_{(node\ distance\ to\ obs)})^2,$$

$D_{(node\text{-}parking\_goal)}$ is a distance from the candidate node to the final parking goal, $D_{(node\text{-}vehicle\_position)}$ is a distance from the candidate node to the autonomous vehicle, $D_{(node\ project\ to\ boundary)}$ is a distance from the candidate node to a closest boundary of a road, $D_{(node\ project\ to\ lane\ center)}$ is a distance from the candidate node to a center of a lane neighboring the candidate node, $D_{(node\ distance\ to\ obs)}$ is a distance from the candidate node to a closest obstacle, and $W_{goal}$, $W_{vehicle}$, $W_{boundary}$, $W_{lane}$, and $W_{obs}$ are corresponding weights.

18. A system for determining an intermediate parking goal of an autonomous vehicle, wherein the autonomous vehicle comprises a controller, the controller comprises a processor and a storage device storing computer executable code, and the computer executable code, when executed at the processor, is configured to:

prepare a driving plan toward a final parking goal and a parking plan to park at the final parking goal;

drive the autonomous vehicle toward the final parking goal according to the driving plan;

switch from the driving plan to the parking plan when the autonomous vehicle is within a predetermined distance to the final parking goal; and when the final parking goal is inaccessible: determine the intermediate parking goal, and park the autonomous vehicle to the intermediate parking goal;

wherein the intermediate parking goal is determined by: searching candidate nodes for the intermediate parking goal; calculating cost for each of the candidate nodes; and selecting one of the candidate nodes that has the lowest cost as the intermediate parking goal.

19. The system of claim 18, wherein the final parking goal is inaccessible when both the final parking goal and extended parking goals are inaccessible, and the extended parking goals at least comprise parking spaces neighboring the final parking goal.

20. The system of claim 19, wherein the predetermined distance is determined based on speed and size of the autonomous vehicle, and the extended parking goals comprise the parking spaces within a predetermined radius to the final parking goal.

* * * * *